(12) United States Patent
Ogawa et al.

(10) Patent No.: US 12,352,194 B2
(45) Date of Patent: Jul. 8, 2025

(54) METHOD OF MANUFACTURING EXHAUST PIPE

(71) Applicant: FUTABA INDUSTRIAL CO., LTD., Aichi (JP)

(72) Inventors: Shigeru Ogawa, Aichi (JP); Riku Ono, Aichi (JP); Akira Sakai, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 18/747,794

(22) Filed: Jun. 19, 2024

(65) Prior Publication Data

US 2025/0012211 A1    Jan. 9, 2025

(30) Foreign Application Priority Data

Jul. 7, 2023 (JP) ................................ 2023-112346

(51) Int. Cl.
*F01N 13/18* (2010.01)
*F16L 23/12* (2006.01)

(52) U.S. Cl.
CPC .......... *F01N 13/1805* (2013.01); *F16L 23/12* (2013.01)

(58) Field of Classification Search
CPC . F16L 23/12; F16L 23/16; F16L 23/04; F16L 23/036; F01N 13/1827; F01N 2470/10; F01N 13/1805; F01N 13/1838; F01N 13/185

See application file for complete search history.

(56) References Cited

U.S. PATENT DOCUMENTS

| | | | | | |
|---|---|---|---|---|---|
| 3,632,143 | A | * | 1/1972 | Lessmann | F16L 19/0212 403/29 |
| 4,576,247 | A | * | 3/1986 | Thorpe | B21D 39/06 181/243 |
| 5,393,108 | A | * | 2/1995 | Kerr | F01N 13/1805 285/379 |
| 5,876,070 | A | * | 3/1999 | McNealy | F16L 23/003 285/55 |
| 7,118,140 | B2 | * | 10/2006 | Kilgore | F02M 61/168 123/456 |
| 2005/0002836 | A1 | * | 1/2005 | Hardesty | F01N 3/2875 422/177 |

(Continued)

FOREIGN PATENT DOCUMENTS

JP 2014010475 A 1/2014
JP 2022181467 A 12/2022

*Primary Examiner* — Aaron M Dunwoody
(74) *Attorney, Agent, or Firm* — David D. Brush; Westman, Champlin & Koehler, P.A.

(57) ABSTRACT

A method of manufacturing an exhaust pipe includes inserting a cover member into an approximately circular opening provided at a first end of a first exhaust pipe. An inner circumferential portion of the cover member has a ring shape with a central axis. When the cover member is inserted into the opening, its outer circumferential surface faces a first inner circumferential surface of the exhaust pipe. A maximum width of the inner circumferential portion is equal to, or greater than, a radius of a circumference of the opening. A minimum width of the inner circumferential portion is smaller than the radius. A circumferential length of the outer circumferential surface is shorter than the length of the circumference of the opening.

7 Claims, 8 Drawing Sheets

(56) References Cited

U.S. PATENT DOCUMENTS

| | | | |
|---|---|---|---|
| 2009/0038879 A1* | 2/2009 | Sato | F01N 1/089 |
| | | | 181/228 |
| 2010/0005798 A1* | 1/2010 | Finkbeiner | F01D 9/023 |
| | | | 285/55 |
| 2010/0155169 A1* | 6/2010 | Hanitzsch | F01N 13/185 |
| | | | 285/368 |
| 2019/0292971 A1* | 9/2019 | McFarland | F01N 13/08 |
| 2021/0301711 A1* | 9/2021 | Aizawa | F01N 13/1805 |
| 2022/0065155 A1* | 3/2022 | Samdaeng | F02F 1/4271 |
| 2022/0381175 A1* | 12/2022 | Hiramatsu | F01N 13/1805 |

\* cited by examiner

METHOD OF MANUFACTURING EXHAUST PIPE

CROSS-REFERENCE TO RELATED APPLICATIONS

This application claims the benefit of Japanese Patent Application No. 2023-112346 filed on Jul. 7, 2023 with the Japan Patent Office, the entire disclosure of which is incorporated herein by reference.

BACKGROUND

The present disclosure relates to a method of manufacturing an exhaust pipe.

Turbochargers for an engine of a vehicle, and peripheral components thereof, are required to be resistant to high temperature oxidation as well as repeated oxidation due to exposure to high temperature exhaust gas and repeated heating and cooling. To address this, Japanese Unexamined Patent Application Publication No. 2022-181467 discloses a technique for improving heat resistance of an exhaust pipe by providing a cover member at an opening of the exhaust pipe into which exhaust gas from a turbocharger flows to cover a region of an inner circumferential surface of the exhaust pipe around the opening.

The cover member is a perfectly round ring-shaped member, and comprises an inner circumferential portion and a held portion. The inner circumferential portion covers the inner circumferential surface of the exhaust pipe. The held portion extends outward from an end of the inner circumferential portion. The inner circumferential portion has a tightening allowance around the entire circumference for the opening of the exhaust pipe so that the inner circumferential portion has a larger outer diameter than the opening of the exhaust pipe that is formed into a perfect circle. The cover member is firstly inserted into the opening of the exhaust pipe so that the inner circumferential portion covers the inner circumferential surface of the exhaust pipe. Thereafter, to the opening of the exhaust pipe into which the cover member is inserted, another exhaust pipe on an upstream side is fastened with a v-band clamp or the like. At that time, the held portion of the cover member is held by end surfaces that surround openings of these exhaust pipes.

SUMMARY

However, in the cover member having the aforementioned shape, if the tightening allowance of the inner circumferential portion of the cover member before inserted for the opening of the exhaust pipe exceeds a specified value, then the cover member inserted into the opening of the exhaust pipe is more likely to buckle. As a result, since the inner circumferential portion of the cover member tends to deform toward the inside of the exhaust pipe, that is, in a direction to separate the inner circumferential portion and the inner circumferential surface of the exhaust pipe, an area of contact between the inner circumferential portion and the inner circumferential surface of the exhaust pipe is reduced, making it difficult for the cover member to be held on the exhaust pipe.

In one aspect of the present disclosure, it is preferable that buckling of the cover member inserted into the opening of the exhaust pipe can be inhibited.

One aspect of the present disclosure provides a method of manufacturing an exhaust pipe that forms a flow path of exhaust gas of a vehicle. The method comprises inserting a cover member into an approximately circular opening provided at a first end of a first exhaust pipe. The cover member comprises an inner circumferential portion and a held portion. The inner circumferential portion is a ring-shaped portion having a central axis. When the cover member is inserted into the opening, an outer circumferential surface of the inner circumferential portion faces an inner circumferential surface of the first exhaust pipe. The held portion extends outward from an end of the inner circumferential portion. The held portion is held by the first end, and a second end of a second exhaust pipe connected to the first end. A direction along a plane orthogonal to the central axis of the inner circumferential portion is a width direction. A maximum width along the width direction from the central axis of the inner circumferential portion to the outer circumferential surface is equal to, or greater than, a radius of a circumference of the opening. A minimum width along the width direction from the central axis of the inner circumferential portion to the outer circumferential surface is smaller than the radius. A circumferential length of the outer circumferential surface is shorter than a length of the circumference of the opening.

In the configuration as above, when viewed along the central axis of the inner circumferential portion with the cover member placed over the opening, a gap is formed between a portion corresponding to the minimum width of the inner circumferential portion and the inner circumferential surface of the opening. Since the length of an outer circumference of the inner circumferential portion is shorter than the length of the circumference of the opening, the aforementioned gap can remain even if the inner circumferential portion is inserted into the opening with the maximum width of the inner circumferential portion being reduced and the minimum width of the inner circumferential portion being increased by the amount of reduction. That is, when the inner circumferential portion is inserted into the opening, the inner circumferential portion is easily deformed, allowing the deformation to escape to the aforementioned gap. Accordingly, it is possible to inhibit buckling of the cover member inserted into the opening of the first exhaust pipe.

In one aspect of the present disclosure, the first end may include a chamfered portion. The chamfered portion is formed to surround the opening, and tilts away towards the first end from a pipe central axis of the first exhaust pipe. When viewed along the pipe central axis upon inserting the cover member into the opening, a portion corresponding to the maximum width of the inner circumferential portion before insertion into the opening may be located over the chamfered portion, and a portion corresponding to the minimum width of the inner circumferential portion before insertion into the opening may be located inward from the chamfered portion. According to the configuration as such, the inner circumferential portion moves along the chamfered portion. Thus, the cover member can be easily inserted into the opening of the first exhaust pipe.

In one aspect of the present disclosure, the inner circumferential portion may have an approximately elliptical-shaped cross section orthogonal to the central axis. According to the configuration as such, buckling of the cover member inserted into the opening of the first exhaust pipe can be inhibited.

In one aspect of the present disclosure, a portion corresponding to the maximum width of the inner circumferential portion may be located at a heat spot portion of the first exhaust pipe. According to the configuration as such, the heat spot portion of the first exhaust pipe contacts the inner circumferential portion. Thus, heat resistance of the first exhaust pipe can be improved.

In one aspect of the present disclosure, a portion corresponding to the maximum width of the inner circumferential portion may be located at a weak strength portion of the first exhaust pipe. According to the configuration as such, the weak strength portion of the first exhaust pipe contacts the inner circumferential portion. Thus, heat resistance of the first exhaust pipe can be improved.

In one aspect of the present disclosure, a hole may be locally provided at the first end. The weak strength portion may be located on the inner circumferential surface facing the hole. According to the configuration as such, the weak strength portion of the first exhaust pipe contacts the inner circumferential portion. Thus, heat resistance of the first exhaust pipe can be improved.

In one aspect of the present disclosure, the first exhaust pipe may be located downstream of the second exhaust pipe in a flow direction of the exhaust gas. According to the configuration as such, the exhaust gas tends to hit the first end of the first exhaust pipe on the downstream side in the flow direction of the exhaust gas. Thus, damage to the first end due to heat of the exhaust gas can be effectively inhibited by providing the cover member at the first end.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. First Exhaust Pipe

Figure 1:
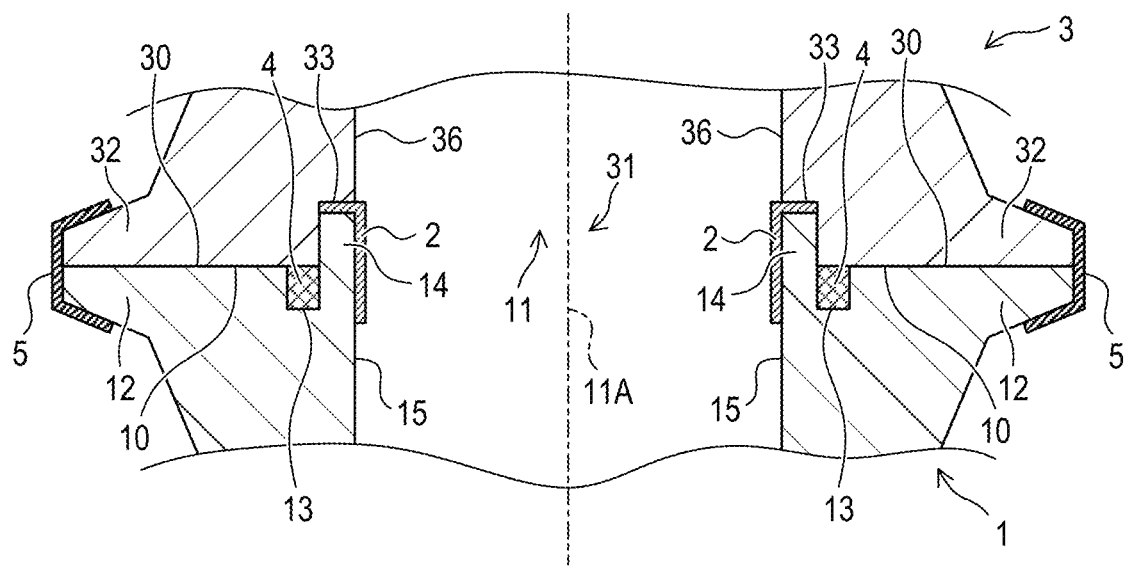
FIG. 1 is a cross-sectional view of a first exhaust pipe and a second exhaust pipe fastened together along a central axis thereof, including a long diameter portion of a cover member.
Figure 3:
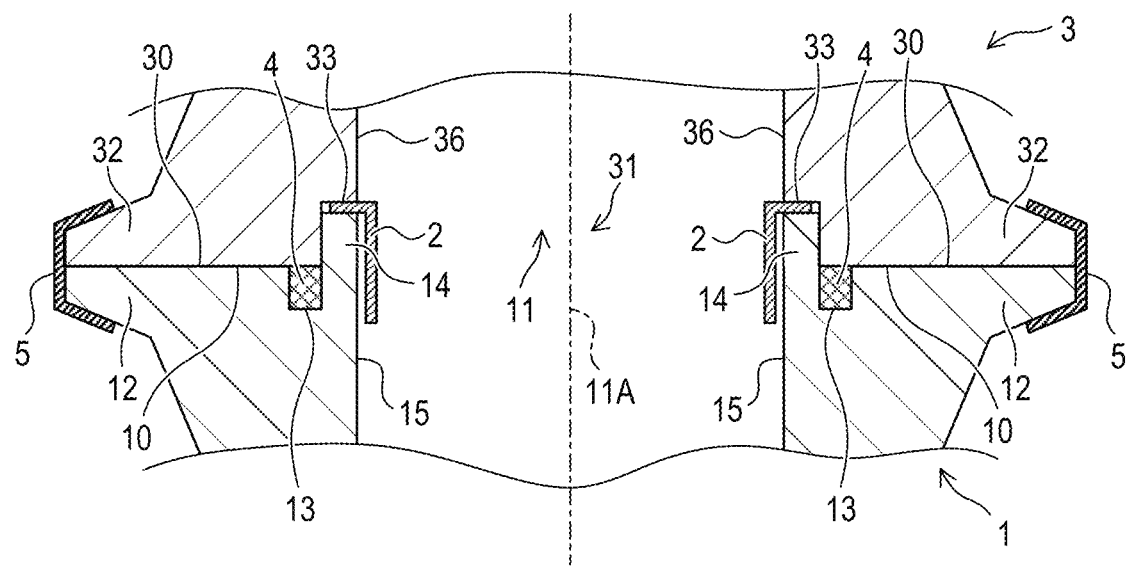
FIG. 3 is a cross-sectional view of the first exhaust pipe and the second exhaust pipe fastened together along the central axis, including a short diameter portion of the cover member.

A first exhaust pipe 1 shown in FIGS. 1 and 3 forms a part of a flow path of exhaust gas from an engine of a vehicle. As an example, the first exhaust pipe 1 is fastened with a v-band clamp 5 to a downstream side of a second exhaust pipe 3 that discharges the exhaust gas from a turbocharger. Also, the first exhaust pipe 1 is configured to accommodate a purification member (for example, a catalyst or a filter) for purifying the exhaust gas.

As an example, the first exhaust pipe 1 and the second exhaust pipe 3 may be made from austenitic stainless steel having heat resistance. However, the first exhaust pipe 1 and the second exhaust pipe 3 may be made from any steel material having heat resistance, other than austenitic stainless steel. Also, the second exhaust pipe 3 may be made from a material having higher heat resistance than a material forming the first exhaust pipe 1.

As shown in FIGS. 1 to 4, the first exhaust pipe 1 comprises a first end 10, a first opening 11, a first flange 12, and a cover member 2 to be described later.

The first opening 11 is an approximately circular opening located at the first end 10 of the first exhaust pipe 1. The first opening 11 is located on an upstream side of the first exhaust pipe 1 in a flow direction of the exhaust gas, and is connected to the second exhaust pipe 3. Hereinafter, a straight line passing a center of the first opening 11 and orthogonal to the first opening 11 is referred to as a central axis 11A.

The first flange 12 is provided at the first end 10 of the first exhaust pipe 1, and is used for fastening to the second exhaust pipe 3.

The first end 10 surrounds the first opening 11, and has a flat surface extending in a direction orthogonal to the central axis 11A of the first opening 11. The first end 10 includes a groove 13 and a first rim 14.

The first rim 14 protrudes toward the second exhaust pipe 3 from the first end 10 along the central axis 11A. The first rim 14 is adjacent to the first opening 11, and surrounds the first opening 11. A holding surface 14A located at a top of the first rim 14 is a flat surface extending in a direction orthogonal to the central axis 11A. Also, an inner circumferential surface of the first rim 14 forms an inner circumferential surface 15 of the first exhaust pipe 1.

Figure 2:
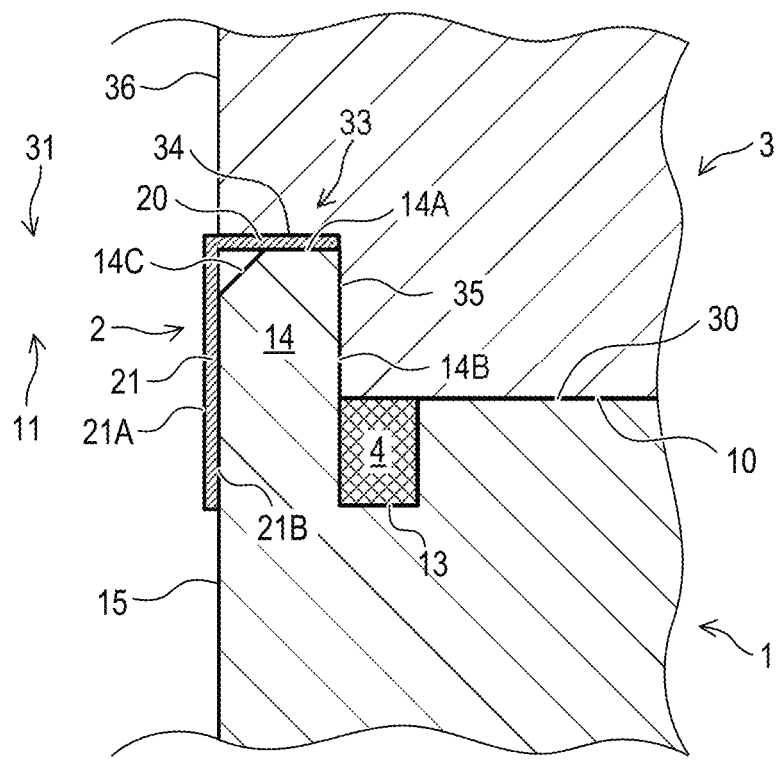
FIG. 2 is an enlarged view of a surrounding region of the cover member and a first rim in the cross-sectional view of FIG. 1.
Figure 4:
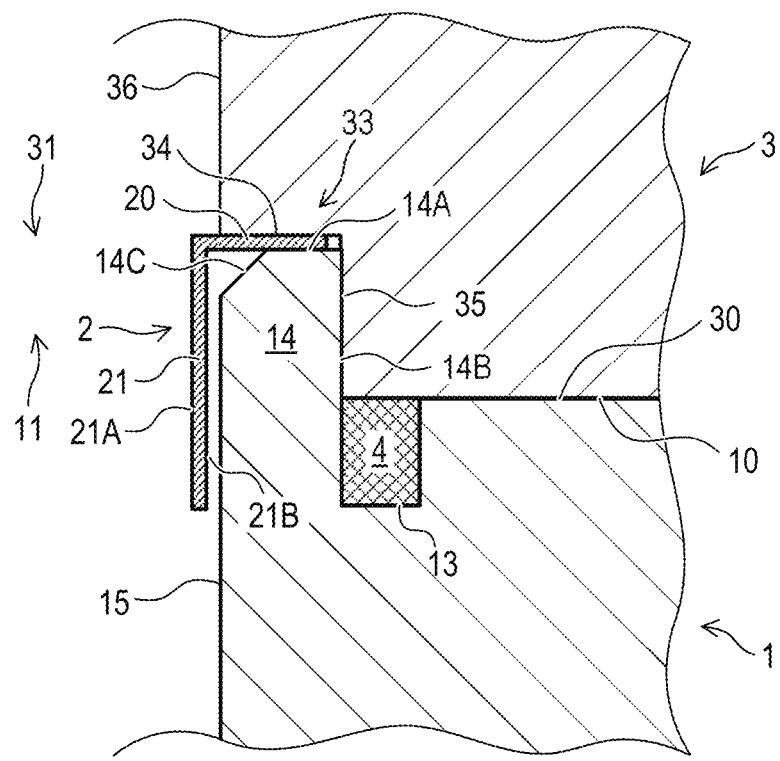
FIG. 4 is an enlarged view of the surrounding region of the cover member and the first rim in the cross-sectional view of FIG. 3.

In addition, as shown in FIGS. 2 and 4, a chamfered portion 14C is formed at a boundary between the holding surface 14A and the inner circumferential surface 15 of the first rim 14. The chamfered portion 14C is formed to surround the first opening 11, and tilts away from the central axis 11A toward the first end 10. The chamfered portion 14C is tilted, for example, at 10 to 80 degrees, more preferably at 45 degrees, relative to the central axis 11A.

The groove 13 is provided at the first end 10, and surrounds the first opening 11. The groove 13 is provided adjacent to an outer side of the first rim 14. An outer circumferential surface 14B of the first rim 14 protrudes from a bottom surface of the groove 13 along the central axis 11A. A ring-shaped gasket 4 is arranged in the groove 13 in order to seal a gap between the first opening 11 and a second opening 31 of the second exhaust pipe 3.

2. Second Exhaust Pipe

As shown in FIGS. 1 to 4, the second exhaust pipe 3 comprises a second end 30, the second opening 31, and a second flange 32.

The second opening 31 is located at the second end 30 of the second exhaust pipe 3. Also, the second opening 31 is connected to the first opening 11 of the first exhaust pipe 1, and has the same shape as the first opening 11 (as an example, an approximately circular shape).

The second flange 32 is provided at the second end 30 of the second exhaust pipe 3, and is used for fastening to the first exhaust pipe 1.

The second end 30 surrounds the second opening 31, and has a flat surface extending in a direction orthogonal to the central axis 11A of the first opening 11 of the first exhaust pipe 1 that is connected to the second opening 31. The second end 30 has a depression 33.

The depression 33 is formed on the second end 30 to be adjacent to the second opening 31 and surround the second opening 31. As shown in FIGS. 2 and 4, the depression 33 has a bottom surface 34 and a first inner circumferential surface 35.

The bottom surface 34 is a flat surface extending in a direction orthogonal to the central axis 11A of the first opening 11 that is connected to the second opening 31, and is provided to circle around an inner circumferential surface of the second exhaust pipe 3. Also, the bottom surface 34 forms a stepped portion on the inner circumferential surface of the second exhaust pipe 3, and partitions the inner circumferential surface into the first inner circumferential surface 35 and a second inner circumferential surface 36.

The first inner circumferential surface 35 is adjacent to the second opening 31, and surrounds the second opening 31. Also, the first inner circumferential surface 35 is adjacent to the second inner circumferential surface 36 across the bottom surface 34. The first inner circumferential surface 35 has a larger diameter than the second inner circumferential surface 36.

3. Cover Member

As shown in FIGS. 1 to 6, the cover member 2 is provided at the first end 10 of the first exhaust pipe 1, and held by the first end 10 and the second end 30 of the second exhaust pipe 3. The cover member 2 is a ring-shaped member provided to surround the first opening 11. The cover member 2 comprises a held portion 20 and an inner circumferential portion 21, and has an L-shaped cross section orthogonal to its circumferential direction.

The inner circumferential portion 21 is a flat ring-shaped member having a central axis 21C. An up-down direction of the inner circumferential portion 21 is approximately coincident with a direction orthogonal to a radial direction of the cover member 2. An outer circumferential surface 21B of the inner circumferential portion 21 faces a region on the inner circumferential surface 15 of the first exhaust pipe 1 around the first opening 11. Specifically, the outer circumferential surface 21B of the inner circumferential portion 21 contacts that region, or is arranged with a gap relative to that region. The central axis 11A of the first exhaust pipe 1 and the central axis 21C of the cover member 2 are coincident with each other when the cover member 2 is attached to the first end 10.

The held portion 20 is also a flat ring-shaped member. A right-left direction of the held portion 20 is approximately coincident with the radial direction of the cover member 2. The held portion 20 extends outward from an end of the inner circumferential portion 21 in the up-down direction. The held portion 20 is held by the holding surface 14A of the first rim 14 of the first exhaust pipe 1 and the bottom surface 34 of the depression 33 of the second exhaust pipe 3.

The cover member 2 is made from a material having higher heat resistance than the material forming the first end 10 of the first exhaust pipe 1, and so on. Specifically, the cover member 2, as an example, may be made from a ferritic steel material. Of course, the cover member 2 may be made from other materials. In addition, heat resistance of the material forming the cover member 2 may be approximately the same as, or lower than, that of the material forming the first end 10 of the first exhaust pipe 1, and so on.

4. Attachment of Cover Member

Next, a method of attaching the cover member 2 to the first end 10 of the first exhaust pipe 1, in other words, a method of manufacturing the first exhaust pipe 1 with the cover member 2 attached to the first end 10 will be described.

<Cover Member Before and After Attachment>

Figure 5:
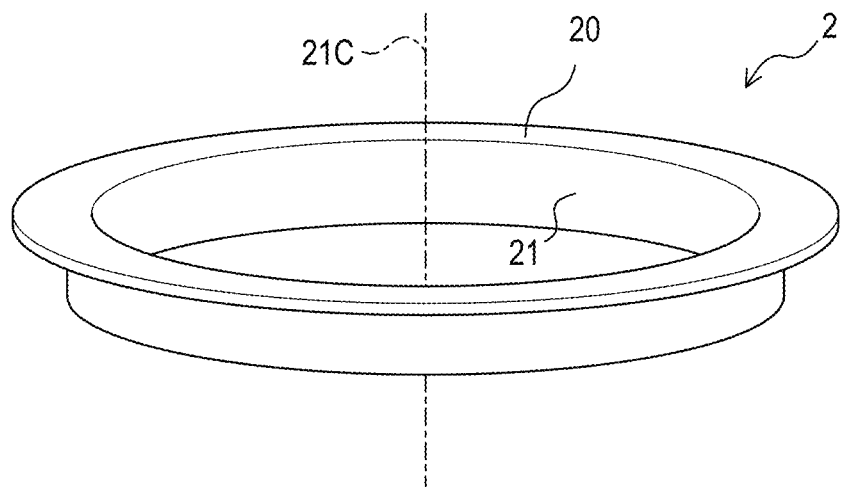
FIG. 5 is a perspective view of the cover member.
Figure 6:
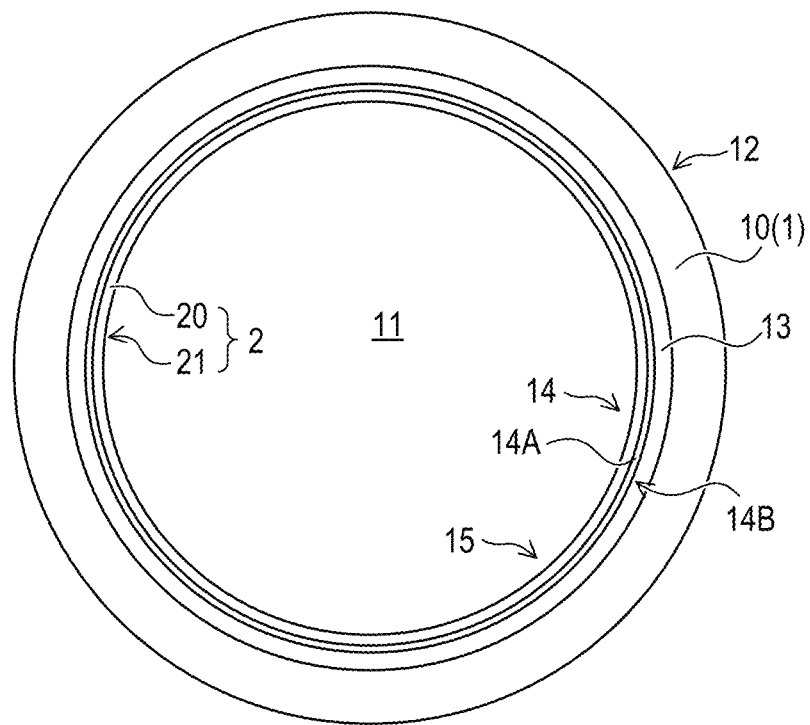
FIG. 6 is a front view of a first end of the first exhaust pipe with the cover member.
Figure 7:
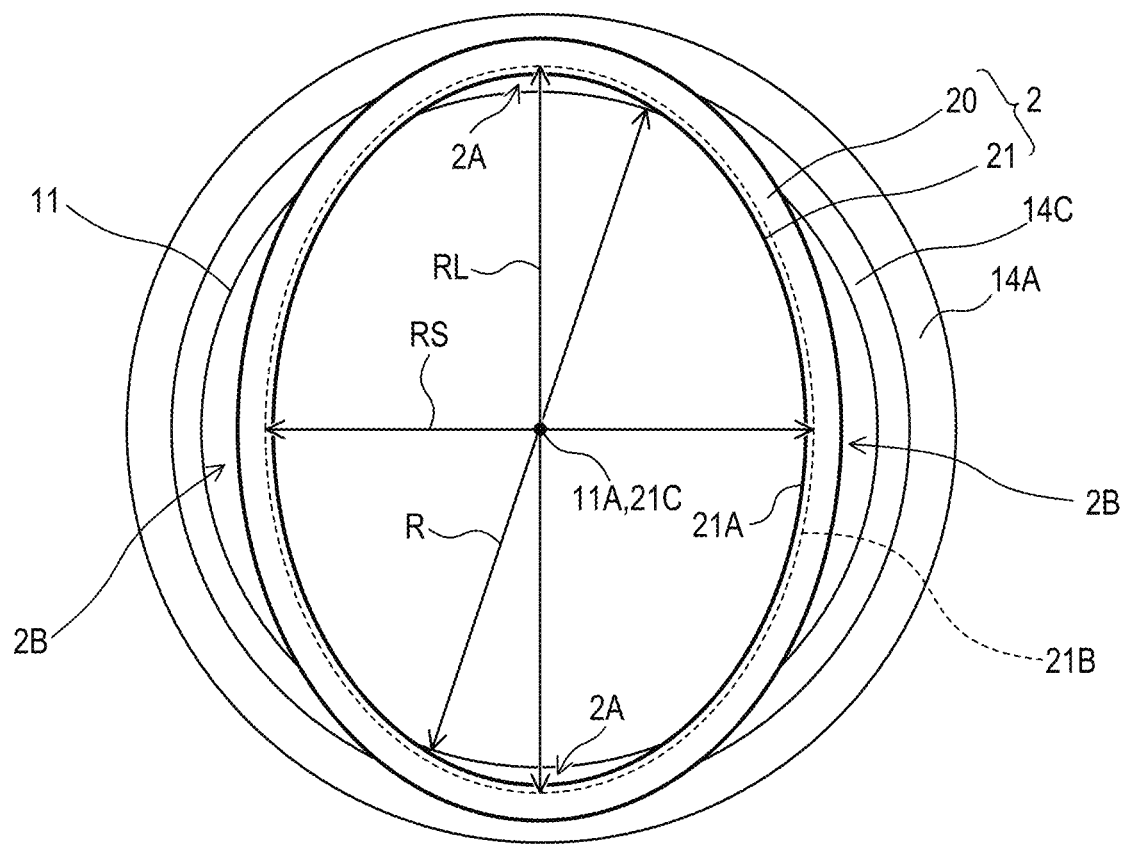
FIG. 7 is a front view of a first opening, and the cover member before attached to the first end.

As shown in FIGS. 5 and 7, the cover member 2 before attachment to the first end 10 has an approximately elliptical ring shape. Specifically, the inner circumferential portion 21 and the held portion 20 have an approximately elliptical-shaped cross section orthogonal to the central axis 21C of the cover member 2.

Specifically, as shown in FIG. 7, a long diameter RL of an approximate ellipse formed by the outer circumferential surface 21B of the inner circumferential portion 21 is greater than a diameter R of the first opening 11, and a short diameter RS of the approximate ellipse is smaller than the diameter R of the first opening 11.

In other words, if a direction along a plane orthogonal to the central axis 21C is a width direction, then a maximum width that is the longest of a distance along the width direction from the central axis 21C of the inner circumferential portion 21 to the outer circumferential surface 21B (that is, a long radius RL/2) is greater than a radius R/2 of the first opening 11. Also, a minimum width that is the shortest of the distance along the width direction from the central axis 21C of the inner circumferential portion 21 to the outer circumferential surface 21B (that is, a short radius RS/2) is smaller than the radius R/2 of the first opening 11. The long diameter RL may be approximately the same as the diameter R of the first opening 11, and the maximum width (that is, the long radius RL/2) may be approximately the same as the radius R/2 of the first opening 11.

In addition, a circumference of the approximate ellipse, in other words, a circumferential length of the outer circumferential surface 21B is shorter than a length of a circumference of the first opening 11.

Figure 8:
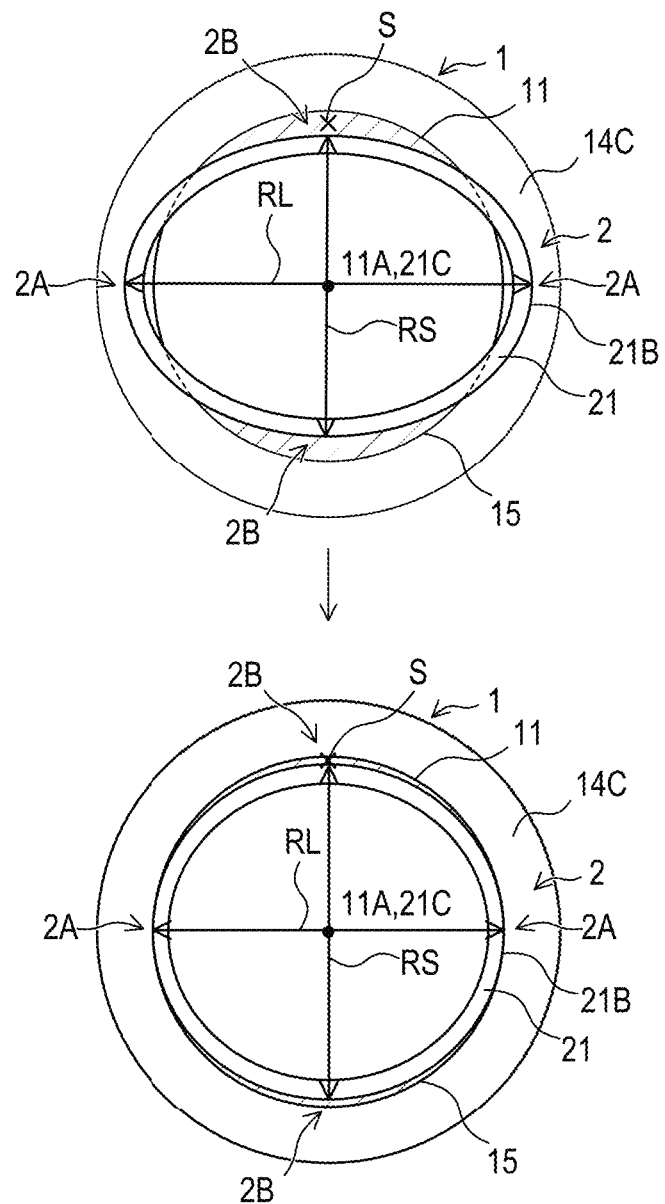
FIG. 8 is an explanatory view showing deformation of an inner circumferential portion of the cover member in an insertion process.

Attachment of the cover member 2 to the first end 10 is performed by an insertion process shown in FIG. 8. The cover member 2 attached to the first end 10 is arranged along the circumference of the first opening 11 in an elastically deformed state, and has an approximately elliptical shape with the long diameter RL shortened and the short diameter RS extended. The cover member 2 may have an approximately circular shape. Accordingly, a position of the cover member 2 is maintained by elastic force of the cover member 2. In FIG. 8, the held portion 20 of the cover member 2 is omitted for convenience of explanation.

If the cover member 2 attached to the first end 10 has an approximately elliptical shape, then the outer circumferential surface 21B of the inner circumferential portion 21 at each of two long diameter portions 2A of the cover member 2 after the attachment is in contact with the inner circumferential surface 15 of the first exhaust pipe 1. On the other hand, the outer circumferential surface 21B of the inner circumferential portion 21 at each of two short diameter portions 2B of the cover member 2 is arranged with a gap S relative to the inner circumferential surface 15 of the first exhaust pipe 1.

The long diameter portion 2A indicates a region of the cover member 2, before attachment to the first end 10, around each end of the long diameter RL. A region of the cover member 2, after attachment to the first end 10, corresponding to the long diameter portion 2A of the cover member 2 before the attachment is also referred to as the long diameter portion 2A. The short diameter portion 2B indicates a region of the cover member 2, before attachment to the first end 10, around each end of the short diameter RS. A region of the cover member 2, after attachment to the first end 10, corresponding to the short diameter portion 2B of the cover member 2 before the attachment is also referred to as the short diameter portion 2B.

<Insertion Process>

The cover member 2 is brought closer to the first opening 11 in a state where the central axis 21C of the cover member 2 is approximately coincident with the central axis 11A of the first exhaust pipe 1, and inserted to first opening 11. In the present embodiment, as an example, by the inner circumferential portion 21 of the cover member 2 being pressed into the first opening 11, the cover member 2 is press-fit to the first opening 11.

In the present embodiment, when viewed along the central axis 11A at the time of inserting the cover member 2 into the first opening 11, an end of the inner circumferential portion 21 at each of the long diameter portions 2A is located over the chamfered portion 14C of the first exhaust pipe 1. An end of the inner circumferential portion 21 at each of the short diameter portions 2B is located inward from the chamfered portion 14C of the first exhaust pipe 1.

Figure 9:
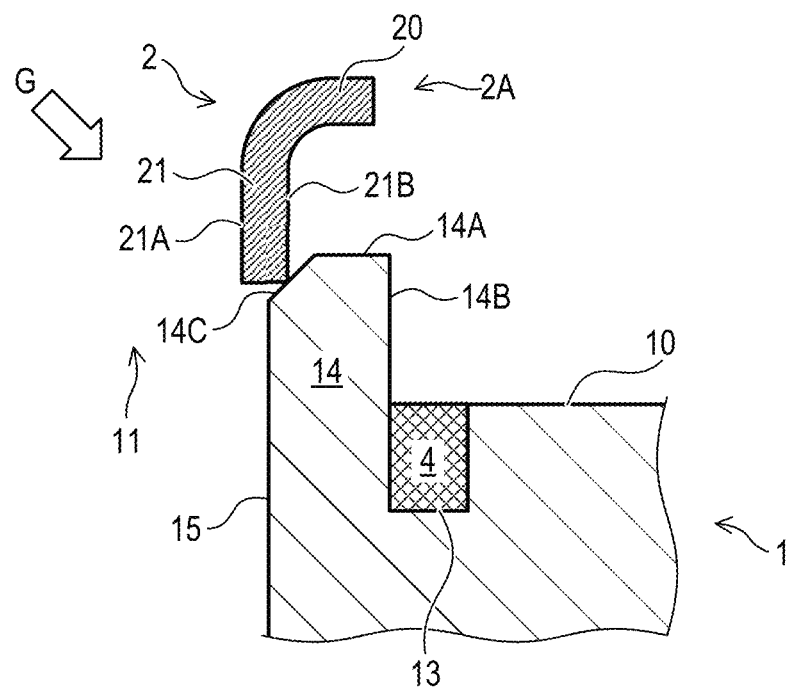
FIG. 9 is a view showing a position of a long diameter portion of the cover member relative to a chamfered portion in the insertion process.
Figure 10:
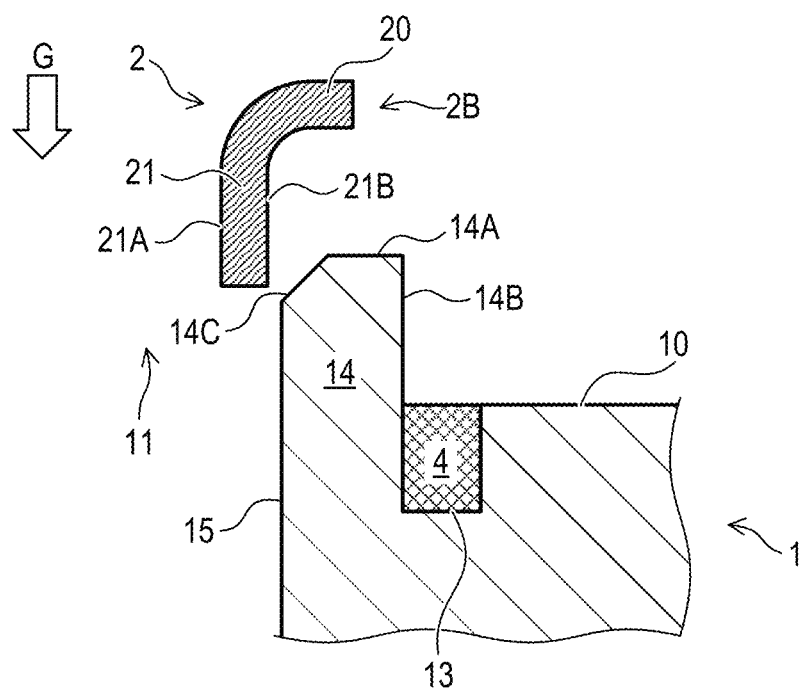
FIG. 10 is a view showing a position of a short diameter portion of the cover member relative to the chamfered portion in the insertion process.

Thus, as shown in FIG. 9, the end of the inner circumferential portion 21 at the long diameter portion 2A of the cover member 2 hits the chamfered portion 14C of the first exhaust pipe 1 during the insertion of the cover member 2. The inner circumferential portion 21 is then deformed to tilt inward due to a slope of the chamfered portion 14C, and guided into the first opening 11. On the other hand, as shown in FIG. 10, the end of the inner circumferential portion 21 at the short diameter portion 2B does not hit the chamfered portion 14C and enters the first opening 11.

In the present embodiment, the cover member 2 is arranged over the first opening 11 in the insertion process so that, after the insertion of the cover member 2 into the first opening 11, the inner circumferential portion 21 at the long diameter portion 2A of the cover member 2 is located at a heat spot portion of the first exhaust pipe 1. The heat spot portion is a portion of the inner circumferential surface 15 of the first exhaust pipe 1 susceptible to damage, for example, a portion where a flow of deflected exhaust gas tends to concentrate, and as a result, the temperature tends to locally increase. If a waste gate is provided inside the second exhaust pipe 3, the heat spot portion is a portion where a flow of exhaust gas from the waste gate concentrates.

As a result, the inner circumferential portion 21 of the cover member 2 attached to the first opening 11 is brought into contact with the heat spot portion, and the exhaust gas can be inhibited from directly hitting the heat spot portion.

On the other hand, the inner circumferential portion 21 at the short diameter portion 2B of the cover member 2 is in a state where there is the gap S relative to the inner circumferential surface 15 of the first exhaust pipe 1.

Thereafter, for example, the first end 10 of the first exhaust pipe 1 with the cover member 2 and the second end 30 of the second exhaust pipe 3 are fastened with a v-band clamp 5 or the like.

5. Effect

According to the embodiment detailed above, the following effects can be obtained.

(5a) In the present embodiment, the first opening 11 of the first exhaust pipe 1 has an approximately circular shape, and the cover member 2 has an approximately elliptical shape. Thus, when viewed along the central axis 21C, with the cover member 2 placed over the first opening 11 in a state where the central axis 21C of the cover member 2 is approximately coincident with the central axis 11A of the first exhaust pipe 1, the gap S is formed between the inner circumferential portion 21 at the short diameter portion 2B of the cover member 2 and the inner circumferential surface 15 of the first opening 11. Also, the circumferential length of the outer circumferential surface 21B of the inner circumferential portion 21 is shorter than the length of the circumference of the first opening 11. Thus, even if the inner circumferential portion 21 is inserted into the first opening 11, and the long diameter RL of the inner circumferential portion 21 is reduced and the short diameter RS of the inner circumferential portion 21 is extended by the reduction, the aforementioned gap S can remain. That is, when the inner circumferential portion 21 is inserted into the first opening 11, the inner circumferential portion 21 can be easily deformed, and allows the deformation to escape to the aforementioned gap S. Accordingly, buckling of the cover member 2 inserted into the first opening 11 of the first exhaust pipe 1 can be inhibited. As a result, the inner circumferential portion 21 of the cover member 2 is less likely to deform toward the inside of the first exhaust pipe 1, that is, in a direction to separate the inner circumferential portion 21 and the inner circumferential surface 15 of the first exhaust pipe 1. Thus, it is possible to inhibit the cover member 2 from becoming difficult to be held on the first exhaust pipe 1 due to reduction of an area of contact between the inner circumferential portion 21 and the first exhaust pipe 1.

(5b) In the present embodiment, upon inserting the cover member 2 into the first opening 11, the inner circumferential portion 21 at the long diameter portion 2A of the cover member 2 is located over the chamfered portion 14C, and the inner circumferential portion 21 at the short diameter portion 2B of the cover member 2 is located inward from the chamfered portion 14C. As a result, inner circumferential portion 21 at the long diameter portion 2A of the cover member 2 moves along the chamfered portion 14C, and the inner circumferential portion 21 at the short diameter portion 2B of the cover member 2 moves without hitting the chamfered portion 14C. Thus, the cover member 2 can be easily inserted into the first opening 11 of the first exhaust pipe 1.

(5c) In the present embodiment, after the insertion of the cover member 2 into the first opening 11, the cover member 2 is arranged over the first opening 11 in the insertion process so that the inner circumferential portion 21 at the long diameter portion 2A of the cover member 2 is located at the heat spot portion of the first exhaust pipe 1. Thus, since the heat spot portion of the first exhaust pipe 1 contacts the inner circumferential portion 21, it is possible to inhibit the exhaust gas from directly hitting the heat spot portion. As a result, heat resistance of the first exhaust pipe 1 can be improved.

(5d) In the present embodiment, the cover member 2 is attached to the first end 10 of the first exhaust pipe 1 located downstream of the second exhaust pipe 3. Since the exhaust gas tends to hit the first end 10, the cover member 2 provided to the first end 10 can effectively inhibit the first end 10 from being damaged by the heat of the exhaust gas.

In the present embodiment, the first exhaust pipe 1 corresponds to an example of an exhaust pipe, the first opening 11 corresponds to an example of an opening, the central axis 21C corresponds to an example of a central axis, and the central axis 11A corresponds to an example of a pipe central axis. A radius of the long diameter RL corresponds to an example of a maximum width, and a radius of the short diameter RS corresponds to an example of a minimum width. The end of the inner circumferential portion 21 at the long diameter portion 2A corresponds to an example of a portion corresponding to a maximum width of the inner circumferential portion 21, and the end of the inner circumferential portion 21 at the short diameter portion 2B corresponds to an example of a portion corresponding to a minimum width of the inner circumferential portion 21.

6. Other Embodiments

An embodiment of the present disclosure has been described in the above. However, the present disclosure is not limited to the above-described embodiment, and may take various forms.

(6a) In the above-described embodiment, the cover member 2 having an L-shaped cross section orthogonal to the circumferential direction is shown as an example. However, the cross-sectional shape of the cover member is not limited to this.

Figure 11:
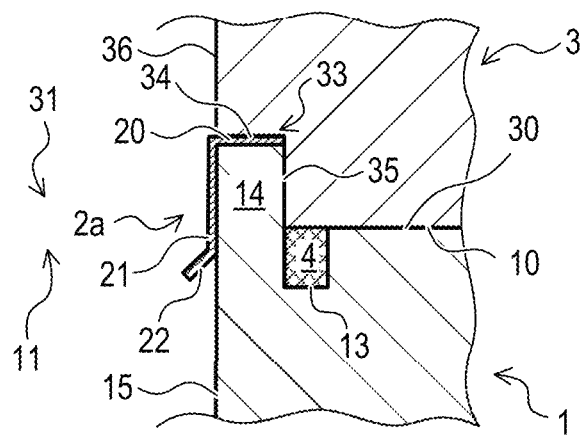
FIG. 11 is a cross-sectional view of the cover member along its central axis, showing a shape of the cover member in a first modified example.

For example, as shown in FIG. 11, at an end of an inner circumferential portion 21 of a cover member 2a opposite to an end provided with the held portion 20, a tip end 22 that bends away from the inner circumferential surface 15 of the first exhaust pipe 1 may be provided. The tip end 22 is provided around the entire circumference of the end of the inner circumferential portion 21. The tip end 22, for example, may linearly extend or may be curved at a cross section of the cover member 2 orthogonal to the circumferential direction.

The configuration of the cover member 2a can simplify an operation of inserting the cover member 2a into the first opening 11, in other words, an operation of attaching the cover member 2a to the first rim 14 at the first end 10 of the first exhaust pipe 1. Also, possible damage to the cover member 2a and the first end 10 upon attaching the cover member 2a to the first rim 14 can be inhibited, which makes it easier to improve quality.

Figure 12:
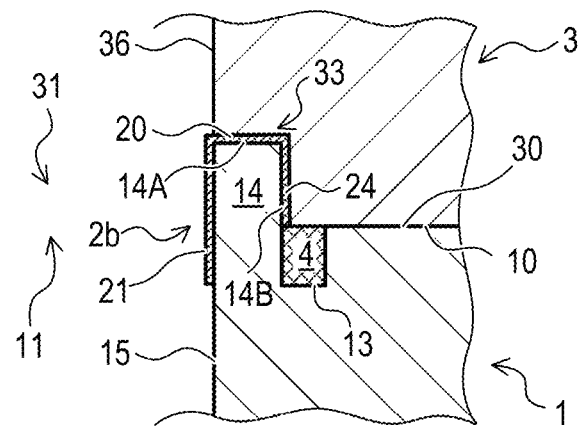
FIG. 12 is a cross-sectional view of the cover member along the central axis, showing the shape of the cover member in a second modified example.

In addition, for example, as shown in FIG. 12, an outer circumferential portion 24 may be provided which protrudes in the same direction as the inner circumferential portion 21 from an end of the held portion 20 of the cover member 2b opposite to an end provided with the inner circumferential portion 21, that is, from a rim on an outer circumference side of the held portion 20. The outer circumferential portion 24 is a wall-like portion provided to circle around the rim. That is, the cover member 2b may be a groove-like member having the held portion 20 as a bottom surface, in other words, a member having a U-shaped cross section orthogonal to the circumferential direction, and may be configured to be fit over the first rim 14 upon insertion into the first opening 11. When the cover member 2b is fit over the first rim 14, the held portion 20 covers the holding surface 14A of the first rim 14, and the outer circumferential portion 24 covers the outer circumferential surface 14B of the first rim 14.

Figure 13:
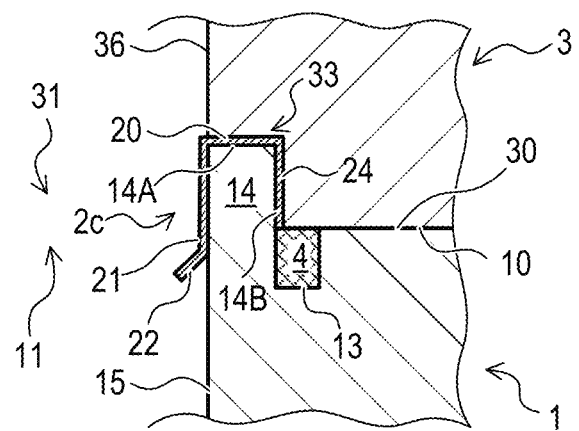
FIG. 13 is a cross-sectional view of the cover member along the central axis, showing a shape of the cover member in a third modified example.

Also, for example, as shown in FIG. 13, the cover member 2c may include the outer circumferential portion 24, similar to the aforementioned cover member 2b, and the tip end 22, similar to the aforementioned cover member 2a.

Figure 14:
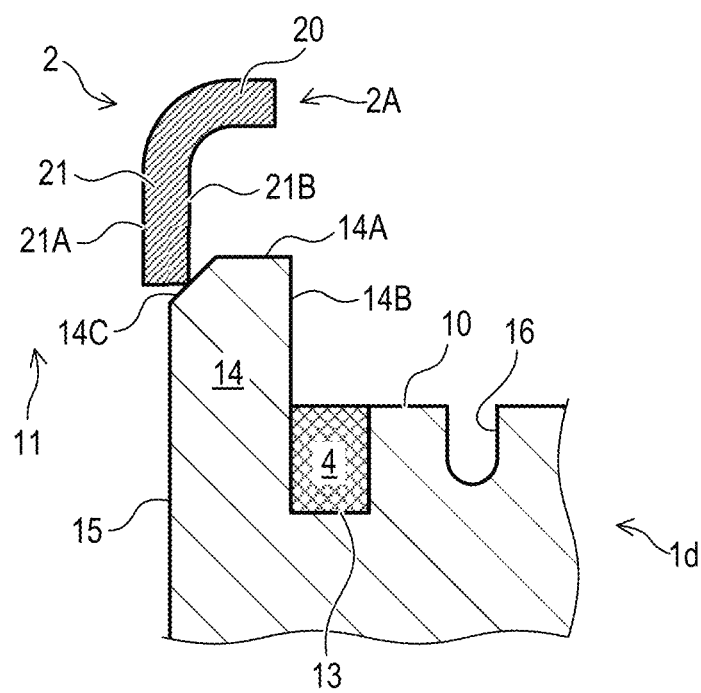
FIG. 14 is a cross-sectional view of the first exhaust pipe along its central axis, showing an example of a weak strength portion of the first exhaust pipe.

(6b) In the above-described embodiment, after the insertion of the cover member 2 into the first opening 11, the cover member 2 is arranged over the first opening 11 so that the inner circumferential portion 21 at the long diameter portion 2A of the cover member 2 is located at the heat spot portion of the first exhaust pipe 1. However, a position of the inner circumferential portion 21 at the long diameter portion 2A of the cover member 2 is not limited to this. For example, the inner circumferential portion 21 at the long diameter portion 2A of the cover member 2 may be located at a weak strength portion that is structurally fragile and weak in heat resistance. As shown in FIG. 14, if a hole 16 is locally provided at the first end 10 of a first exhaust pipe 1d, then a portion of the inner circumferential surface 15 facing the hole 16 is an example of a weak strength portion of the first exhaust pipe 1d.

(6c) In the above-described embodiment, the first rim 14 of the first exhaust pipe 1 has the chamfered portion 14C. However, for example, the first rim does not have to have a chamfered portion. In this case, when the cover member 2 is inserted into the first opening 11, the inner circumferential portion 21 at the long diameter portion 2A of the cover member 2 is located over the holding surface 14A, and the inner circumferential portion 21 at the short diameter portion 2B of the cover member 2 is located inward from the holding surface 14A.

(6d) In the above-described embodiment, the cross section orthogonal to the central axis 21C of the inner circumferential portion 21 has an approximately elliptical shape. However, the shape of the cover member is not limited to this. For example, the cross section orthogonal to the central axis of the inner circumferential portion may have a polygonal shape (as an example, approximately triangular shape).

In this case, when the inner circumferential portion of the cover member and the first opening 11 are overlapped with their centers aligned, the outer circumferential surface of the inner circumferential portion of the cover member has a portion located outside or at approximately the same position as the first opening 11, and a portion located inside the first opening 11. Also, the length of the outer circumference of the inner circumferential portion of the cover member is shorter than the length of the circumference of the first opening 11.

Specifically, three apexes of the triangle are located outside or at approximately the same position as the first opening 11, and center portions of three sides are located inside the first opening 11. This makes the maximum width (that is, a length from the center of the inner circumferential portion to one of apexes) of the cover member to be approximately the same as, or greater than, the radius of the first opening 11, and the minimum width (that is, a length from the center of the inner circumferential portion to the center portion of each side) of the cover member to be smaller than the radius of the first opening 11.

(6e) In the above-described embodiment, the cover member 2 is attached to the first exhaust pipe 1 located downstream of the second exhaust pipe 3. However, for example, the cover member may be attached to the second exhaust pipe located upstream of the first exhaust pipe.

(6f) Two or more functions achieved by one element of the above-described embodiments may be achieved by two or more elements. One function achieved by one element may be achieved by two or more elements. Two or more functions achieved by two or more elements may be achieved by one element. One function achieved by two or more elements may be achieved by one element. Part of the configurations in the above-described embodiments may be omitted. At least part of the configurations in one of the above-described embodiments may be added to or replaced with the configuration in another one of the above-described embodiments.

7. Technical Idea Disclosed in Present Specification

Clause 1

A method of manufacturing an exhaust pipe that forms a flow path of exhaust gas of a vehicle, comprising:
inserting a cover member into an approximately circular opening provided at a first end of a first exhaust pipe, the cover member comprising:
an inner circumferential portion that is a ring-shaped portion having a central axis, an outer circumferential surface of the inner circumferential portion facing an inner circumferential surface of the first exhaust pipe when the cover member is inserted into the opening; and
a held portion that extends outward from an end of the inner circumferential portion, the held portion being held between the first end and a second end of a second exhaust pipe connected to the first end,
a direction along a plane orthogonal to the central axis being a width direction,
a maximum width along the width direction from the central axis of the inner circumferential portion to the outer circumferential surface being equal to, or greater than, a radius of a circumference of the opening,
a minimum width along the width direction from the central axis of the inner circumferential portion to the outer circumferential surface being smaller than the radius,
a circumferential length of the outer circumferential surface being shorter than a length of the circumference of the opening.

Clause 2

The method of manufacturing an exhaust pipe according to Clause 1, wherein
the first end includes a chamfered portion that is formed to surround the opening and tilts away toward the first end from a pipe central axis of the first exhaust pipe, and
when viewed along the pipe central axis upon inserting the cover member into the opening, a portion corresponding to the maximum width of the inner circumferential portion before insertion into the opening is located over the chamfered portion, and a portion corresponding to the minimum width of the inner circumferential portion before insertion into the opening is located inward from the chamfered portion.

Clause 3

The method of manufacturing an exhaust pipe according to Clause 1 or 2, wherein
the inner circumferential portion has an approximately elliptical-shaped cross section orthogonal to the central axis.

Clause 4

The method of manufacturing an exhaust pipe according to any one of Clauses 1 to 3, wherein
a portion corresponding to the maximum width of the inner circumferential portion is located at a heat spot portion of the first exhaust pipe.

Clause 5

The method of manufacturing an exhaust pipe according to any one of Clauses 1 to 3, wherein
a portion corresponding to the maximum width of the inner circumferential portion is located at a weak strength portion of the first exhaust pipe.

Clause 6

The method of manufacturing an exhaust pipe according to any one of Clauses 1 to 5, wherein
the first exhaust pipe is located downstream of the second exhaust pipe in a flow direction of the exhaust gas.

What is claimed is:

1. A method of manufacturing an exhaust pipe that forms a flow path of exhaust gas of a vehicle, comprising:
inserting a cover member into an approximately circular opening provided at a first end of a first exhaust pipe, the cover member comprising:
an inner circumferential portion that is a ring-shaped portion having a central axis, an outer circumferential surface of the inner circumferential portion facing an inner circumferential surface of the first exhaust pipe when the cover member is inserted into the opening; and
a held portion that extends outward from an end of the inner circumferential portion, the held portion being held between the first end and a second end of a second exhaust pipe connected to the first end,
a direction along a plane orthogonal to the central axis being a width direction,
a maximum width along the width direction from the central axis of the inner circumferential portion to the outer circumferential surface being equal to, or greater than, a radius of a circumference of the opening,
a minimum width along the width direction from the central axis of the inner circumferential portion to the outer circumferential surface being smaller than the radius,
a circumferential length of the outer circumferential surface being shorter than a length of the circumference of the opening.

2. The method of manufacturing an exhaust pipe according to claim 1, wherein the first end includes a chamfered portion that is formed to surround the opening and tilts away toward the first end from a pipe central axis of the first exhaust pipe, and when viewed along the pipe central axis upon inserting the cover member into the opening, a portion corresponding to the maximum width of the inner circumferential portion before insertion into the opening is located over the chamfered portion, and a portion corresponding to the minimum width of the inner circumferential portion before insertion into the opening is located inward from the chamfered portion.

3. The method of manufacturing an exhaust pipe according to claim 1, wherein the inner circumferential portion has an approximately elliptical-shaped cross section orthogonal to the central axis.

4. The method of manufacturing an exhaust pipe according to claim 1, wherein a portion corresponding to the maximum width of the inner circumferential portion is located at a heat spot portion of the first exhaust pipe.

5. The method of manufacturing an exhaust pipe according to claim 1, wherein a portion corresponding to the maximum width of the inner circumferential portion is located at a weak strength portion of the first exhaust pipe.

6. The method of manufacturing an exhaust pipe according to claim 5, wherein a hole is locally provided at the first end, and the weak strength portion is located on the inner circumferential surface facing the hole.

7. The method of manufacturing an exhaust pipe according to claim 1, wherein the first exhaust pipe is located downstream of the second exhaust pipe in a flow direction of the exhaust gas.

* * * * *